(12) United States Patent
Tarchinski et al.

(10) Patent No.: US 11,091,055 B2
(45) Date of Patent: Aug. 17, 2021

(54) INTELLIGENT MOTOR VEHICLES, CHARGING SYSTEMS, AND CONTROL LOGIC FOR GOVERNING VEHICLE GRID INTEGRATION OPERATIONS

(71) Applicant: GM Global Technology Operations LLC, Detroit, MI (US)

(72) Inventors: James E. Tarchinski, Rochester Hills, MI (US); Brian J. Koch, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 300 days.

(21) Appl. No.: 16/409,033

(22) Filed: May 10, 2019

(65) Prior Publication Data
US 2020/0353839 A1 Nov. 12, 2020

(51) Int. Cl.
| | |
|---|---|
| *H02J 7/00* | (2006.01) |
| *B60L 55/00* | (2019.01) |
| *B60L 58/12* | (2019.01) |
| *B60L 53/62* | (2019.01) |

(52) U.S. Cl.
CPC .............. *B60L 55/00* (2019.02); *B60L 53/62* (2019.02); *B60L 58/12* (2019.02)

(58) Field of Classification Search
USPC ....................................................... 320/109
See application file for complete search history.

(56) References Cited

U.S. PATENT DOCUMENTS

| | | | |
|---|---|---|---|
| 5,642,270 A * | 6/1997 | Green ..................... | B60L 53/64 363/17 |
| 6,275,004 B1 | 8/2001 | Tamai et al. | |
| 7,810,476 B2 | 10/2010 | Wang et al. | |
| 8,091,416 B2 | 1/2012 | Wang et al. | |
| 8,201,444 B2 | 6/2012 | Wang et al. | |
| 8,276,373 B2 | 10/2012 | Wang et al. | |
| 8,392,091 B2 | 3/2013 | Hebbale et al. | |
| 8,565,949 B2 | 10/2013 | Christman et al. | |
| 8,612,119 B2 | 12/2013 | Wang et al. | |
| 8,694,197 B2 | 4/2014 | Rajagopalan et al. | |
| 9,058,578 B2 | 6/2015 | Jones et al. | |
| 9,133,750 B2 | 9/2015 | Levijoki et al. | |

(Continued)

*Primary Examiner* — Samuel Berhanu
(74) *Attorney, Agent, or Firm* — Quinn IP Law

(57) ABSTRACT

Presented are vehicle charging systems and control logic for provisioning vehicle grid integration (VGI) activities, methods for making/using such charging systems, and electric-drive vehicles with intelligent vehicle charging and VGI capabilities. A method of controlling charging operations of electric-drive vehicles includes a vehicle controller detecting if a vehicle is coupled to an electric vehicle supply equipment (EVSE), and determining if the vehicle's current mileage exceeds a calibrated mileage threshold. Responsive to the vehicle being connected to the EVSE and the vehicle's current mileage exceeding the calibrated mileage threshold, the controller determines the current remaining life of the vehicle's traction battery pack and the current time in service of the vehicle. The vehicle controller determines if the current remaining battery life exceeds a predicted remaining battery life corresponding to the current time in service. If so, the vehicle controller enables the traction battery pack to transmit electrical power to the EVSE.

20 Claims, 3 Drawing Sheets

(56) References Cited

U.S. PATENT DOCUMENTS

| | | |
|---|---|---|
| 9,142,980 B2 | 9/2015 | Lee |
| 9,660,462 B2 | 5/2017 | Jeon |
| 9,718,371 B2 | 8/2017 | Anglin et al. |
| 2008/0051973 A1 | 2/2008 | Gangopadhyay et al. |
| 2008/0265835 A1 | 10/2008 | Reed et al. |
| 2008/0284385 A1 | 11/2008 | Namuduri et al. |
| 2009/0030712 A1 | 1/2009 | Bogolea et al. |
| 2010/0198754 A1 | 8/2010 | Jones et al. |
| 2011/0101698 A1* | 5/2011 | Saluccio ................. B60L 8/006 |
| | | 290/55 |
| 2011/0215767 A1 | 9/2011 | Johnson et al. |
| 2011/0248675 A1 | 10/2011 | Shiu et al. |
| 2012/0085082 A1 | 4/2012 | Levijoki et al. |
| 2012/0181854 A1 | 7/2012 | Gopalakrishnan et al. |
| 2012/0181953 A1 | 7/2012 | Hsu et al. |
| 2012/0206296 A1 | 8/2012 | Wan |
| 2012/0286063 A1 | 11/2012 | Wang et al. |
| 2013/0024035 A1* | 1/2013 | Ito ........................... B60L 53/65 |
| | | 700/291 |
| 2013/0027048 A1 | 1/2013 | Schwarz et al. |
| 2013/0038279 A1 | 2/2013 | Seyerle et al. |
| 2013/0113413 A1* | 5/2013 | Harty .................... H01M 10/46 |
| | | 320/101 |
| 2013/0119935 A1 | 5/2013 | Sufrin-Disler et al. |
| 2013/0127399 A1 | 5/2013 | Tang et al. |
| 2014/0152232 A1 | 6/2014 | Johnson et al. |
| 2014/0197776 A1 | 7/2014 | Schlaupitz et al. |
| 2015/0084434 A1* | 3/2015 | Mousavi .................. H01H 9/54 |
| | | 307/116 |
| 2016/0052450 A1 | 2/2016 | Chan et al. |
| 2016/0285296 A1 | 9/2016 | Namou et al. |
| 2017/0307390 A1 | 10/2017 | Uyeki |

\* cited by examiner

INTELLIGENT MOTOR VEHICLES, CHARGING SYSTEMS, AND CONTROL LOGIC FOR GOVERNING VEHICLE GRID INTEGRATION OPERATIONS

INTRODUCTION

The present disclosure relates generally to electrical systems for charging motor vehicles. More specifically, aspects of this disclosure relate to systems, methods, and devices for provisioning intelligent vehicle charging and vehicle grid integration activities.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, and rotary engines, as some non-limiting examples. Hybrid and full electric vehicles, on the other hand, utilize alternative power sources to propel the vehicle and, thus, minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel supply system, and exhaust system of an ICE-based vehicle are replaced with an electric motor, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric traction motor. Since hybrid vehicles are able to derive their power from sources other than the engine, hybrid electric vehicle engines may be turned off, in whole or in part, while the vehicle is propelled by the electric motor(s).

Most commercially available hybrid and electric vehicles (collectively "electric drive vehicles") employ a rechargeable traction battery pack (also referred to as "electric-vehicle battery" or "EVB") to store and supply the requisite power for operating the powertrain's motor/generator unit(s). A traction battery pack, which is significantly larger, more powerful, and higher in capacity than a 12-volt starting, lighting, and ignition (SLI) battery, groups stacks of battery cells into individual battery modules that are mounted onto the vehicle chassis, e.g., via a battery housing or support tray. Some vehicle battery systems employ multiple independently-operable, high-voltage battery packs to provide higher voltage delivery and greater system capacity through increased amp-hours. A dedicated Battery Pack Control Module (BPCM) regulates the opening and closing of battery pack contactors to govern which pack or packs will power the vehicle's traction motor(s) at a given time. A high-voltage electric power system governs the transfer of electricity between the traction motor(s) and battery pack(s) of an electric-drive vehicle.

As hybrid and electric vehicles become more prevalent, infrastructure is being developed and deployed to make day-to-day use of such vehicles feasible and convenient. Electric vehicle supply equipment (EVSE) comes in many forms, including residential electric vehicle charging stations (EVCS) purchased and operated by a vehicle owner (e.g., installed in the owner's garage), publicly accessible EVCS deployed by public utilities or private retailers (e.g., at gas stations or municipal charging stations), and sophisticated high-voltage, high-current charging stations used by manufacturers, dealers, and service stations. Plug-in hybrid and electric vehicles, for example, can be recharged by physically connecting a charging cable of the EVCS to a complementary charging port of the vehicle. By comparison, wireless electrical charging systems utilize electromagnetic filed (EMF) induction or other suitable techniques to provide vehicle charging capabilities without the need for charging cables and cable ports. Vehicle electrification presents an opportunity, through charging infrastructure and strategy, to contribute to the capacity and reliability of public power grids. Intelligent vehicles may contribute through participation in vehicle grid integration (VGI) activities by selectively modulating vehicle charging and supporting two-way reverse power flow (RPF) between the vehicle battery system and a public utility.

SUMMARY

Disclosed herein are vehicle charging systems and attendant control logic for provisioning vehicle grid integration activities, methods for making and methods for operating such vehicle charging systems, and electric-drive vehicles with intelligent vehicle charging and VGI capabilities. By way of example, and not limitation, there are presented intelligent electric-drive vehicles with a resident battery system control module (BCM) that utilizes battery life monitoring to govern vehicle participation in VGI activities. The BCM tracks real-time vehicle battery performance relative to projected vehicle battery performance over a calibrated operational life expectancy (e.g., a 10-year timeframe). In an example, memory-stored vehicle calibration data maintains "constant pack life" information as a nominal or expected life usage that will allow the vehicle to reach a 10-year battery life. When the vehicle is solicited for participation in VGI, the BCM retrieves sensor data indicative of the vehicle battery's actual life usage and compares it to the vehicle-calibrated expected life usage data. If the BCM determines that the actual life usage is below the matching data point on a nominal life usage curve, VGI participation is allowed or promoted. On the other hand, the BCM may disable or suppress VGI participation if actual life usage is above the vehicle-calibrated expected life usage.

Continuing with the above example, the BCM may track additional or alternative vehicle operating parameters to determine when it is in the owner's best interest to allow the vehicle's traction battery pack to be utilized for VGI activities. A more complex example may include tracking vehicle-specific driving behavior and charging behavior, and generating an analog scale that would enable increased compensation for VGI participation by vehicles with a large quantity of unused battery life. This same analog scale would stipulate that vehicles with less unused battery life would receive less compensation. An optional feature may include presenting actual and expected life usage information to the driver, and prompting the driver to approve or override vehicle participation in VGI activities.

Attendant benefits for at least some of the disclosed vehicle charging system architectures include enabling vehicle owners to participate in VGI activities, including demand response (DR) initiatives like RPF programs, without eroding battery life expectancy. Such DR initiatives may include a power utility company providing the vehicle owner or original equipment manufacturer (OEM) with financial incentives to: (1) permit 3rd-party access to the vehicle; (2) charge the vehicle at certain times and/or on certain days; and (3) sell stored energy from the vehicle's resident battery system to the power utility company, e.g., at times of peak electrical grid demand. Closely regulating vehicle participation in VGI activities in accord with the disclosed concepts will help to boost electric driving range and increase battery life expectancy while concomitantly reducing warranty claims for the traction battery pack.

Aspects of this disclosure are directed to methods for making and methods for using any of the disclosed electric-drive vehicles, vehicle charging systems, and/or in-vehicle battery control systems. In an example, a method is presented for controlling charging operations of electric-drive motor vehicles. This representative method includes, in any order and in any combination with any of the above and below disclosed options and features: detecting, via a resident or remote vehicle controller, if the host vehicle is electrically connected to an EVSE; determining, via the vehicle controller, if the vehicle's current mileage exceeds a calibrated mileage threshold; responsive to the motor vehicle being electrically connected to the EVSE and the vehicle's current mileage exceeding the calibrated mileage threshold, determining a current remaining battery life of the vehicle's traction battery pack and a current time in service of the motor vehicle; determining, via the vehicle controller, if the current remaining battery life exceeds a predicted remaining battery life corresponding to the current time in service; and, responsive to the current remaining battery life exceeding the predicted remaining battery life, the vehicle controller enabling the traction battery pack to transmit (AC and/or DC) electrical power to the EVSE.

Additional aspects of this disclosure are directed to electric-drive vehicles with intelligent vehicle charging and VGI capabilities, including DR-based RPF functionality. As used herein, the terms "vehicle" and "motor vehicle" may include any relevant vehicle platform, such as passenger vehicles (REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with multiple road wheels and other standard original equipment. Mounted on the vehicle body is one or more electric traction motors that selectively drive one or more of the road wheels to thereby propel the vehicle. Also mounted on the vehicle body is one or more rechargeable traction battery packs that selectively store and transmit electric current to power the traction motor(s).

Continuing with the above example, the electric-drive vehicle also includes a vehicle controller that regulates operation of the traction motor(s) and traction battery pack(s). The vehicle controller is programmed to detect if the vehicle is electrically connected to an EVSE and, if so, determine if the vehicle's current mileage exceeds a calibrated mileage threshold. Upon confirming that the motor vehicle is electrically connected to the EVSE and the vehicle's current mileage is greater than the calibrated mileage threshold, the vehicle controller determines a current remaining battery life of the traction battery pack(s) and a current time in service of the vehicle. The vehicle controller then determines if the current remaining battery life is greater than a predicted remaining battery life that corresponds to the vehicle's current time in service. If so, the controller responsively commands the traction battery pack to transmit electrical power to the EVSE.

For any of the disclosed systems, methods, and devices, the current remaining battery life may correspond to a current state of health (SOH) of the traction battery pack and the current time in service may correspond to a total days in service (DIS) of the motor vehicle. For this example, the predicted remaining battery life is extracted from a memory-stored nominal SOH curve calibrated to the motor vehicle. In the same vein, the current remaining battery life and current time in service may correspond to a current battery capacity of the traction battery pack and a total years in service (YIS) of the motor vehicle, respectively. For this example, the predicted remaining battery life is extracted from a memory-stored nominal battery capacity curve that is calibrated to the motor vehicle.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
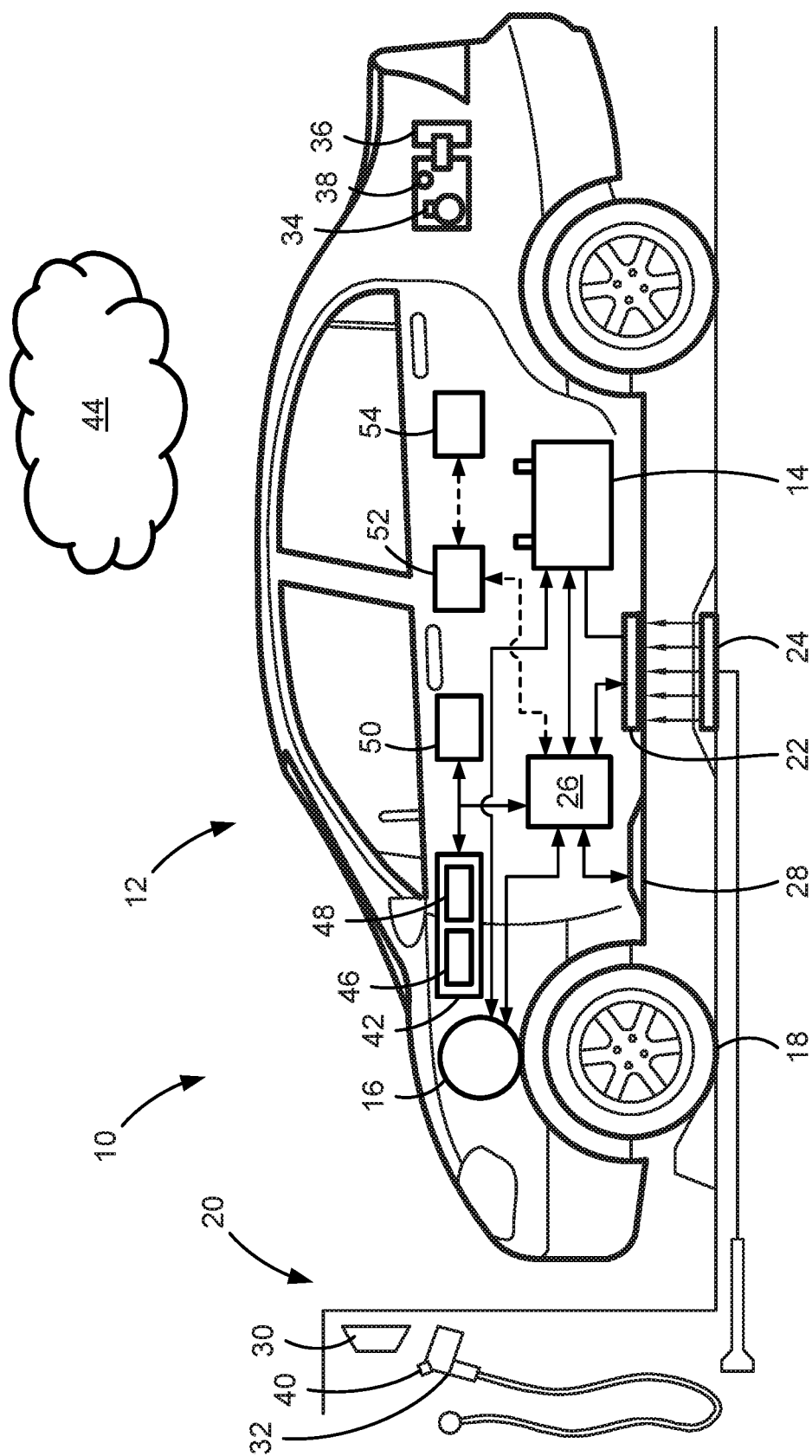
FIG. 1 is a partially schematic, side-view illustration of a representative electric-drive motor vehicle with a network of in-vehicle controllers, sensing devices, and communication devices for executing intelligent vehicle charging and VGI operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a sedan-style, hybrid electric or full electric ("electric-drive") passenger vehicle. Packaged within a vehicle body 12 of the automobile 10, e.g., inside a passenger compartment, trunk compartment, or dedicated battery compartment, is a traction battery pack 14 that powers one or more electric motor-generators 16 that drive one or more of the vehicle's road wheels 18 and thereby propel the vehicle 10. The illustrated automobile 10—also referred to herein as "motor vehicle" or "vehicle" for short—is merely an exemplary application with which aspects and features of this disclosure may be practiced. In the same vein, implementation of the present concepts for the specific electric vehicle supply equipment (EVSE) illustrated in FIG. 1 should also be appreciated as an exemplary application of the disclosed concepts and features. As such, it will be understood that aspects and features of this disclosure may be applied to other types of EVSE, and implemented for any logically relevant type of motor vehicle. Moreover, only select components of the vehicle and EVSE have been shown and will be described in additional detail herein. Nevertheless, the motor vehicles and EVSE architectures discussed below can include numerous additional and alternative features, and other commercially available peripheral components, for example, to carry out the various protocols and algorithms of this disclosure.

FIG. 1 is a simplified illustration of the electric-drive vehicle 10 docked at and operably coupled to a vehicle charging station 20 for recharging an onboard rechargeable energy source, such as a high-voltage direct current (DC) traction battery pack 14. Traction battery pack 14 may take on many suitable configurations, including an array of lead-acid, lithium-ion, or other applicable type of rechargeable electric vehicle batteries (EVB). To provide an operable coupling between the traction battery pack 14 and vehicle charging station 20, the vehicle 10 may include an inductive charging component 22, e.g., with an integrated induction coil, that is mounted to the underside of the vehicle body 12. This inductive charging component 22 functions as a wireless charging interface that is compatible with a wireless charging pad or platform 24, e.g., with an internal EMF coil, of the vehicle charging station 20. In the illustrated example, the wireless charging pad/platform 24 is located on the floor of the vehicle charging station 20, positioned in accordance with a "target location" that serves as a desired parking location for purposes of efficient and effective wireless charging of the vehicle 10. In particular, FIG. 1 depicts the vehicle 10 parked in a location that helps to ensure the inductive charging component 22 is substantially aligned in both lateral and longitudinal dimensions with the wireless charging pad 24. Put another way, the vehicle 10 in FIG. 1 is considered to be in proper fore-aft alignment and in proper starboard-port alignment with a designated target location to complete an inductive charging event for the vehicle 10.

The vehicle charging station 20 may employ any heretofore and hereinafter developed type of wired and/or wireless charging technology, including inductive charging, radio charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-down, and/or phase-shifted by in-vehicle electrical modulation circuitry to charge the traction battery pack 14 or other energy source of the vehicle 10 (e.g., a standard 12V lead-acid starting, lighting, and ignition (SLI) battery, an auxiliary power module, etc.). Optimal wireless charging performance may be obtained when the vehicle 10 is aligned with the charging station 20 such that the maximum available EMF force is transferred by the wireless charging pad 24 to the inductive charging component 22.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle components. Contactors controlled by the ECU 26, for example, may isolate the traction battery pack 14 from other components when opened, and connect the traction battery pack 14 to other components when closed. The ECU 26 is also communicatively connected to each electric motor-generator unit (MGU) 16 to control, for example, bi-directional transfer of energy between the traction battery pack 14 and MGU 16. For instance, traction battery pack 14 may provide a DC voltage while the motor-generator(s) 16 may operate using a three-phase AC current; in such an instance, ECU 26 converts the DC voltage to a three-phase AC current for use by the motor-generator(s) 16. In a regenerative mode where the electric machine(s) 16 act as generators, the ECU 26 may convert three-phase AC current from the motor-generator(s) 16 to DC voltage compatible with the traction battery pack 14. The representative ECU 26 is also shown communicating with charging component 22, for example, to condition the power supplied from the vehicle charging station 20 to the battery pack 14 to help ensure proper voltage and current levels. The ECU 26 may also interface with the charging station 20, for example, to coordinate the delivery of power to and from the vehicle 10.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) electrical connector with single or split phase modes operating at 120 to 240 volts (V) with alternating current (AC) at up to 80 amperes (A) peak current for conductive vehicle charging. Furthermore, the charging connector 32 can also be designed to meet the standards set forth in International Electrotechnical Commission (IEC) 62196-3 Fdis and/or IEC 62196-2, as well as any other presently available or hereinafter developed standards. A charge port 34 accessible on the exterior of vehicle body 12 is a wired charging interface functioning as an electrical inlet into which electrical connector 32 may be plugged or otherwise mated. This port 34 enables a user to easily connect and disconnect electric vehicle 10 to/from a readily available AC or DC source, such as a public utility power grid, via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the electric-drive vehicle 10 may monitor wired/wireless charging availability, wireless power quality, and other related issues that may affect vehicle charging. According to the illustrated example, the vehicle ECU 26 of FIG. 1 communicates with and receives sensor signals from a monitoring system, represented herein by one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that which are shown in the drawings. A CPD sensor 38 mounted by the charge port 34 may sense, and be polled or read by the vehicle's ECU 26 to determine, a door status (open/closed) of the CPD 36. As another option, a latching button 40, which helps to physically attach and secure the electrical connector 32 to the charge port 34, may include an internal switch (e.g., an SAE S3 type switch) that functions as a sensing device to detect whether or not the electrical connector 32 is operatively connected to the charge port 34. There are numerous other types of sensing devices that can also be used, including, for example, thermal sensing devices, such as passive thermal infrared sensors, optical sensing devices, such as light and laser-based sensors, acoustic sensing devices, such as surface acoustic wave (SAW) and ultrasonic sensors, capacitive sensing devices, such as capacitive-based proximity sensors, etc.

The representative vehicle 10 of FIG. 1 may be originally equipped with a vehicle telecommunication and information ("telematics") unit 42 that wirelessly communicates (e.g., via cell towers, base stations and/or mobile switching centers (MSCs), etc.) with a remotely located or "off-board" cloud computing system 44. Acting as both a user-input device and a vehicle-output device, telematics unit 42 may be equipped with an electronic video display device 46 and assorted input controls 48 (e.g., buttons, knobs, switches, trackpads, keyboards, touchscreens, etc.). These telematics hardware components may function, at least in part, as a resident vehicle navigation system, e.g., to enable assisted and/or automated vehicle navigation, and as a human/machine interface (HMI), e.g., to enable a user to communicate with the telematics unit 42 and other systems and system components of the vehicle 10. Optional peripheral hardware may include a microphone that provides a vehicle occupant with the ability to input verbal or other auditory commands; the vehicle 10 may be equipped with an embedded voice-processing unit programmed with a computational speech recognition software module. A vehicle audio system with one or more speaker components may provide audible output to a vehicle occupant and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 50, each of which may take on the form of a CD-ROM, magnetic disk, IC device, semiconductor memory (e.g., various types of RAM or ROM), etc., with a real-time clock (RTC). Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 52. Close-range wireless connectivity may be provided via a short-range wireless communication device (e.g., a BLUETOOTH® unit or near field communications (NFC) transceiver), a dedicated short-range communications (DSRC) component, and/or a dual antenna, all of which are collectively represented at 54. The various communications devices described above may be configured to exchange data as part of a periodic broadcast in a Vehicle-to-Vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

Electric-drive vehicle 10 is equipped with the requisite electronic hardware and software to participate in vehicle grid integration (VGI) activities, including demand response (DR) initiatives with reverse power flow (RPF) operations. A DR-based RPF operation may include vehicle-to-grid (V2G) power exchanges in which a power utility company draws a metered fraction of the stored energy in the vehicle's traction battery pack 14, e.g., to satisfy short-term electrical loads at times of peak grid demand. In exchange, the vehicle owner and, potentially, the vehicle OEM may receive compensation for providing this access/flexibility to the power utility company. As will be explained in extensive detail below, vehicle intelligence tracks battery usage over the life of the traction battery pack in order to determine if/when it is in the owner's best interest to engage in VGI activities. Participation in VGI activities may be based solely on battery pack life; for at least some implementations, participation may be based, in whole or in part, on warranty impact or cost effect to the battery pack. In general, the system seeks to enable RPF and other VGI activities without unnecessarily eroding battery life while concomitantly ensuring proper remuneration. Compensation for participation in an RPF operation may a set rater or may be selectively varied (e.g., proportional to available battery life).

Figure 2:
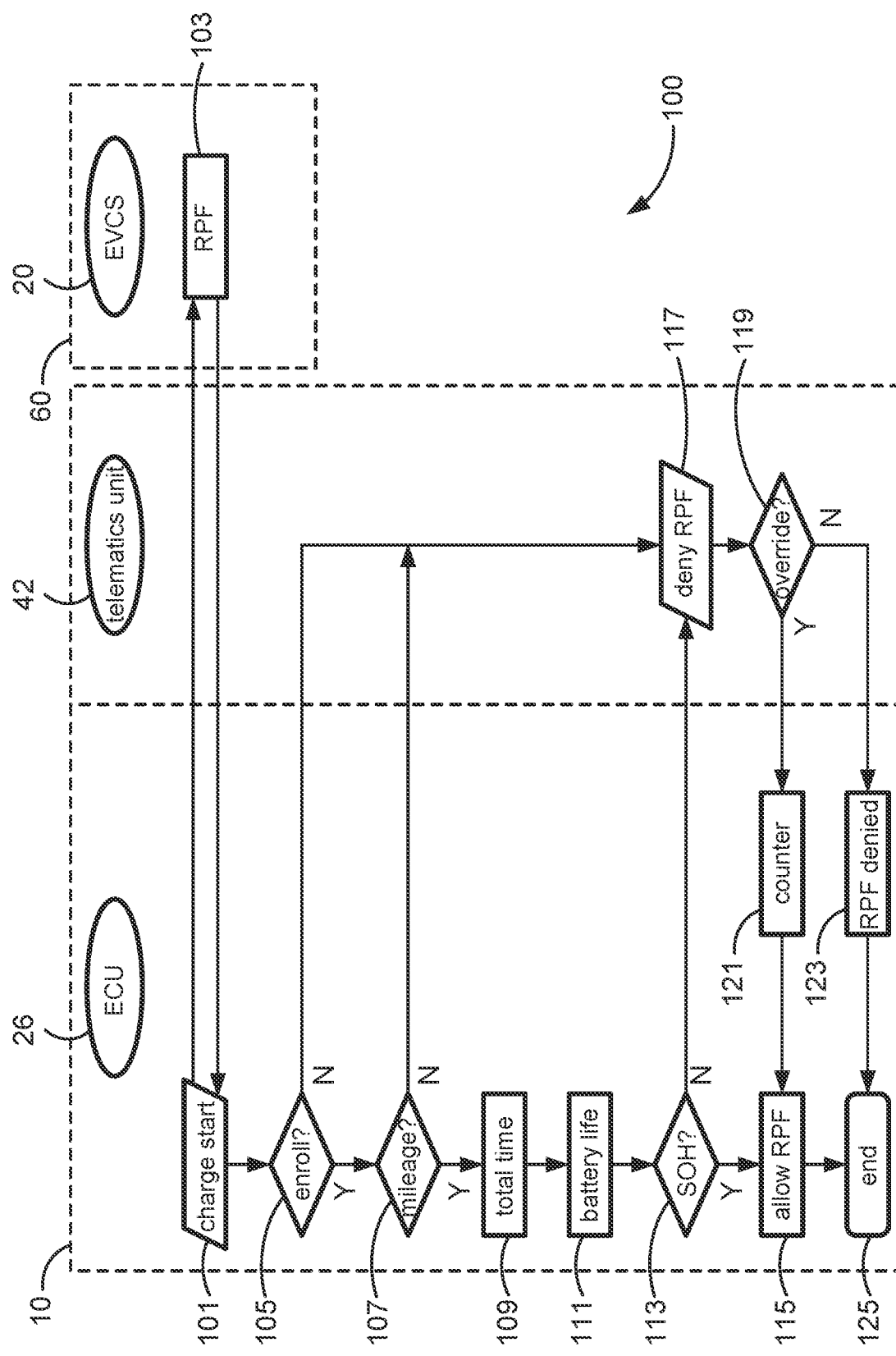
FIG. 2 is a flowchart illustrating a representative intelligent vehicle charging algorithm for governing VGI operations, which may correspond to memory-stored instructions executed by an onboard or remote controller, control-logic circuitry, programmable electronic control unit, or other integrated circuit (IC) device or a network of devices in accord with aspects of the disclosed concepts.

With reference now to the flow chart of FIG. 2, an improved method or control strategy for executing forward and reverse power flow charging operations of an electric-drive vehicle, such as vehicle 10 of FIG. 1, using a commercially available EVSE, such as EVCS 20, is generally described at 100 in accordance with aspects of the present disclosure. Some or all of the operations illustrated in FIG. 2 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at input/output block 101 of FIG. 2 with processor-executable instructions for a programmable controller or control module or similarly suitable processor to call up an initialization procedure for a VGI participation protocol. This routine may be executed in real-time, continuously, systematically, sporadically, and/or at regular intervals during active or inactive vehicle operation. As yet another option, block 101 may initialize responsive to a command prompt from a user or a broadcast prompt signal from a backend or middleware computing node tasked with collecting, analyzing, sorting, storing and distributing vehicle data. To carry out this protocol, a vehicle control system or any combination of one or more subsystems may be operable to receive, process, and synthesize pertinent information and inputs, and execute control logic and algorithms to regulate various battery system, powertrain, starter system, and/or brake system components to achieve desired control targets.

In accord with the illustrated example, the impetus for input/output block 101 may comprise the vehicle's resident ECU 26 receiving one or more sensor signals, user inputs, and/or system indicators denoting the motor vehicle 10 has been operatively coupled via a wired or wireless electrical connection to the charging station 20. As indicated above, for example, proper insertion of the electrical connector 32 into the charge port 34 may be detected via an internal switch in the connector's latching button 40; a binary ON signal is concurrently transmitted from the switch to the ECU 26. Other options for initializing the VGI participation protocol may include receipt of a start prompt from the driver (e.g., via telematics unit 42), receipt of an initialization prompt from a middleware or backend server computing node (e.g., cloud computing system 44), or a resident BCM detecting the onset of a charging current from the EVCS 20.

Prior to, contemporaneous with, or after confirming the host vehicle is operatively connected to a suitable EVSE (VehicleState=ChargeStart), an RPF participation request (VehicleState=RpfStart?) is generated by and sent from a bidirectional EVSE, a utility company through an EVSE, or an in-vehicle, wirelessly connected support service (e.g., ONSTAR®), at process block 103. When properly connected, the vehicle ECU 26 and EVCS 20 of FIG. 1, for example, start communicating with each other as part of a standard vehicle charging procedure. For a fast-charge DC vehicle charging station, the transaction may be based on a high-level communication technique, such as a power line communication (PLC) data exchange, with a backend server-class computer of power utility company 60. Notification of the RpfStart request may be simultaneously transmitted to the vehicle driver or, in instances where the vehicle is being driven by a person other than the owner or is unoccupied, to the vehicle owner.

Embedded within a data payload of the RPF participation request of block 103 may be details related to the RPF operation, such as a recipient, timestamp, type, size, and timing of the desired transfer. This feature provides additional security considering a VGI activity may necessitate permitting 3rd-party access to the vehicle's battery system and in-vehicle computing network, may limit vehicle charging to constrained days, times, and/or transfer rates, and may entail the transmission of stored energy from the vehicle to the EVCS 20 and/or electric power utility company 60. It is envisioned that a VGI activity may take on numerous alternative forms, such as an RPF from a plug-in electric vehicle (PEV) for powering off-vehicle equipment, residential or commercial property, or other electrified vehicles. As an example, an RPF operation may be used to power emergency equipment after a natural disaster. It is also worth noting that reverse power flow from the host vehicle to the off-vehicle load, can be either AC or DC electricity.

Before allowing an aggregator entity, such as power utility company 60, to draw power from the traction battery pack 14, motor vehicle 10 assesses whether or not the RPF operation is in the best interest of the vehicle/owner. As an initial step, the method 100 may first proceed to decision block 105 with memory-stored instructions to determine whether or not the host vehicle is registered to participate in a desired RPF program (RpfEnrolled==TRUE?). Confirmation of RPF registration may come in assorted forms, including ECU 26 commanding telematics unit 42 to transmit a visual or audible prompt to the driver requesting they respond with a user input to verify enrollment. As yet a further option, a digital text message or push notification requesting confirmation may be transmitted to a vehicle occupant's smart phone or handheld computing device; confirmation may be tendered through a suitable wireless interface, such as a BLUETOOTH® or near-field communications (NFC) link.

In place of prompting the owner/driver to confirm enrollment for each individual RPF participation request, registration for VGI activities may be completed one time by the owner or OEM and separately confirmed by vehicle intelligence. The vehicle 10 may be enrolled through a web portal hosted by the power utility company 60 or OEM; verification of pre-enrollment is then stored to local memory via a standardized telematics link for retrieval via the ECU 26 at decision block 105. As yet a further option, the vehicle owner may enroll in RPF programs via an in-vehicle electronic input device, such as a touchscreen input of video display device 46. Rather than demanding manual confirmation, validating vehicle RPF registration at decision block 105 may be wholly automated. By way of example, and not limitation, RPF enrollment may be provisioned through a Smart Grid application programming interface (API) hosted via the power utility company 60 or a 3$^{rd}$-party web hosting service. Responsive to a determination that the host vehicle is not registered to participate in a desired RPF program (block 105=NO), method 100 proceeds to input/output block 117.

Upon confirming that the host vehicle is properly registered to participate in the RPF program (block 105=YES), method 100 proceeds to decision block 107 of FIG. 2 to determine whether or not the vehicle's current total mileage is greater than a calibrated mileage threshold (VehicleMileage>MileageLimitStartOfLife?). Current vehicle mileage may be retrieved in real-time via the ECU 26 from a local cache software component of the engine control unit within which is stored an overall total distance travelled by the vehicle 10. In contrast, the preset mileage threshold may correspond to a vehicle-calibrated mileage at which it is estimated that the traction battery pack 14 is "broken in" and vehicle intelligence has had a sufficient opportunity to learn vehicle battery system and powertrain behavior. Generally speaking, the inquiry carried out at decision block 107 is intended to disallow vehicle RPF participation for at least an initial break-in period and, at the same time, allow the algorithm to aggregate sufficient data on vehicle performance relative to expected battery life usage decline over time. A supplemental delay period may be added if the host vehicle is transferred to another owner to allow the algorithm time to readjust to the driving patterns of the new owner.

It is envisioned that there are other baseline thresholds that may be implemented instead of, or in addition to, total vehicle mileage when determining whether or not to enable an RPF operation. For instance, the ECU 26 may decline an RPF participation request if the vehicle 10 is not in a position to perform RPF functions without negatively impacting battery pack life. As some representative examples, an RPF participation request may be automatically denied if: (1) real-time battery pack state of charge (SOC) is below a preset minimum SOC value; (2) real-time battery pack temperature exceeds a preset maximum temperature; and/or (3) a fault is detected within one of the vehicle's control systems. Responsive to a determination that the host vehicle's current total mileage has not yet surpassed the calibrated mileage threshold (block 107=NO), method 100 proceeds to input/output block 117.

After confirming the host vehicle is operatively coupled to an EVSE (block 101), receiving the RpfStart request (block 103), confirming RpfEnrolled (block 105), and/or ensuring compliance with the MileageLimitStartOfLife baseline (block 107), method 100 continues to process block 109 to ascertain a current total time in service of the host vehicle. This controller variable may be read from an IC-based real-time clock (RTC) that is communicatively connected to the ECU 26. Alternatively, actual time in service data may be retrieved in real-time by the resident ECU 26 from a middleware computing node (e.g., cloud computing system 44), an in-vehicle connected support service, or another suitable source of temporal information. Vehicle time in service may take on various forms, including calculating a total days in service (DIS) (calculate:DisNow) or a total years in service (YIS) (calculate:YisNow) of the motor vehicle. The terms "days in service" and "years in service" may be defined as a total number of days or a total number of years, respectively, from the effective warranty date when the vehicle's warranty was started. Optional variations may gauge time in service as total operating time or total active discharge time of the traction battery pack.

Figure 3:
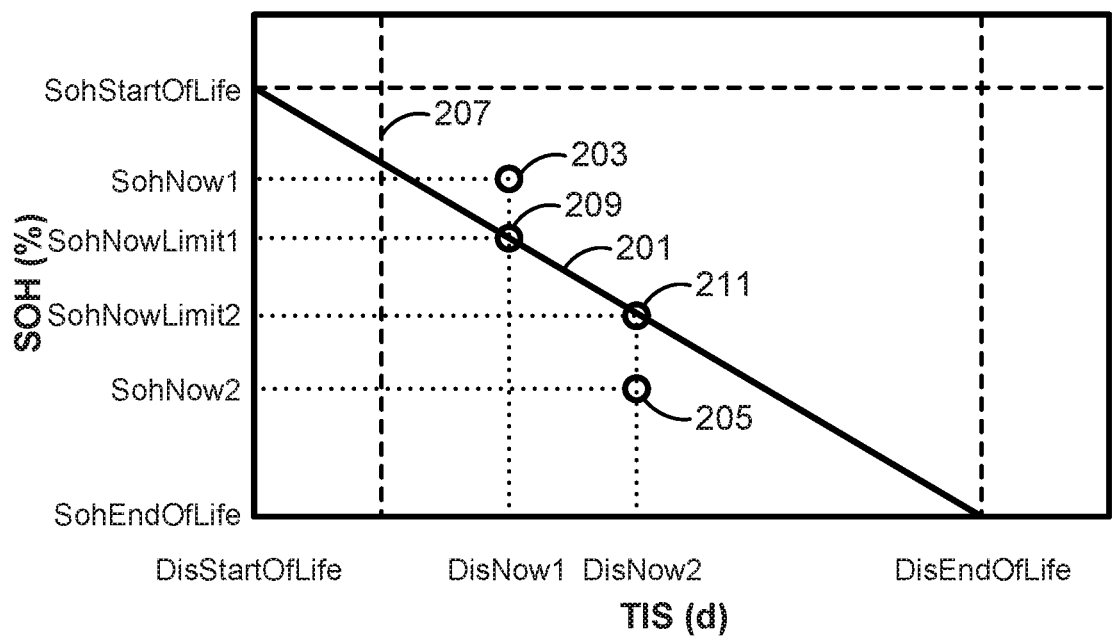
FIG. 3 is a graph of battery state of health (SOH) versus time in service (TIS) (days) illustrating expected life usage compared against actual life usage of a representative traction battery pack in accord with aspects of the disclosed concepts.
Figure 4:
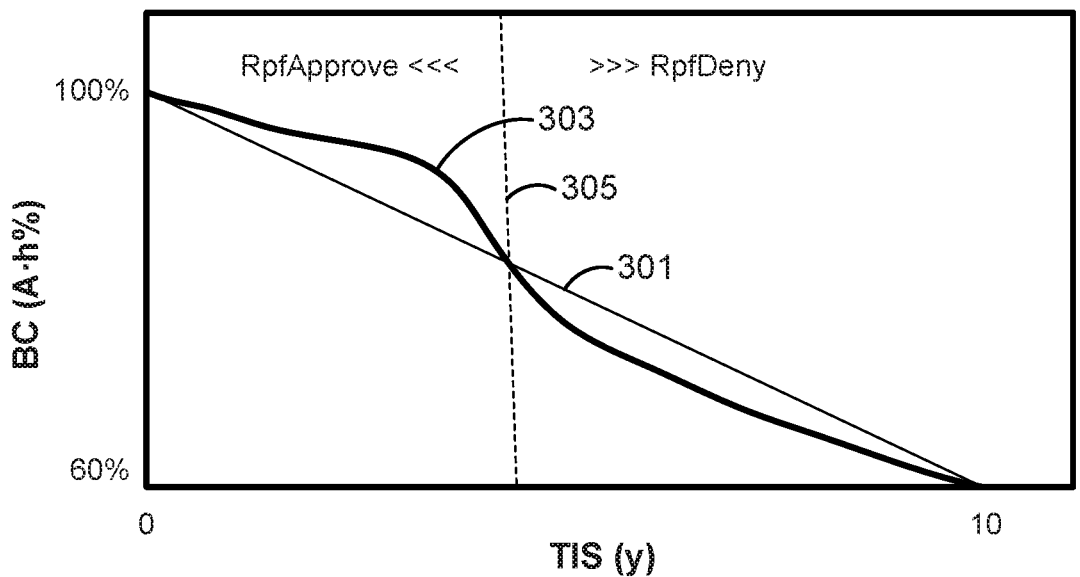
FIG. 4 is a graph of battery capacity (BC) (Amp-hour percentage) versus time in service (TIS) (years) illustrating expected life usage compared against actual life usage of a representative traction battery pack in accord with aspects of the disclosed concepts.

Method 100 of FIG. 2 advances to process block 111 to determine a current remaining battery life of the traction battery pack and a predicted remaining battery life for the traction battery pack. Battery life may be represented by many different traction battery pack parameters, including calculating a battery state of health (SOH) (calculate: SohNow), as shown in FIG. 3, or calculating a battery capacity (BC) (calculate:BcNow), as shown in FIG. 4. A traction battery pack's capacity may be defined as a maximum amount of electrical energy that can be safely stored in and extracted from the pack (generally measured in Amphours (A·h)). BC is a leading health indicator that may be used to determine battery runtime and predict battery end of life. While a new battery may be rated at 100% BC, a pack that is in service likely delivers a reduced amount: a workable capacity bandwidth may be in the range of about 70% to about 100%. Battery SOH is also a measured representation of a battery pack's ability to store and deliver electrical energy compared with a new battery. SOH may be determined using a variety of metrics, including a mathematical sum of a pack's SOC and depth of discharge (DOD), a ratio of maximal releasable capacity (Cmax) to rated capacity (Crate), tracking internal resistance by comparing measured impedance to initial impedance, or other suitable means.

In addition to determining the traction battery pack's actual remaining battery life, process block 111 also estimates a predicted remaining battery life of the battery pack based on the time in service determined at process block 109. For implementations in which battery life is represented by battery SOH (FIG. 3), a predicted remaining battery life of the traction battery pack may be extracted from a memory-stored nominal SOH curve calibrated to the host vehicle/battery pack (calculate:SohNowLimit=f(DisNow)). Alternatively, in cases where battery life is represented by BC (FIG. 4), a predicted remaining battery life of the traction battery pack may be extracted from a memory-stored nominal BC curve calibrated to the vehicle/pack (calculate:BcNowLimit=f(DisNow)). In either instance, method 100 may calculate BcNowLimit or SohNowLimit based on the number of days/years the vehicle's battery pack has been in service since it was originally placed under warranty. It may be desirable, for at least some implementations, to utilize the following simple linear function for this calculation:

$$SohNowLimit = SohStartOfLife - \frac{\left(\frac{SohStartOfLife-}{SohEndOfLife}\right)}{\left(\frac{DisEndOfLife-}{DisStartOfLife}\right)} * DisNow$$

Each of the aforementioned variables will be explained in additional detail below with respect to the discussion of FIG. 3.

With continuing reference to FIG. 2, decision block 113 provides memory-stored, processor-executable instruction to compare the traction battery pack's current remaining battery life and predicted remaining battery life as a key milestone in deciding whether or not to grant RPF participation. RPF participation may be authorized (VehicleState=RpfAllowed) based on a binary algorithm that is set to true upon concluding that the pack's current remaining battery life is greater than the predicted remaining battery life (SohNow>SohNowLimit or BcNow>BcNowLimit). A positive outcome from the foregoing inquiry (block 113=YES) effectuates the enabling (VehicleState=RpfAllowed) and, if desired, the initialization (VehicleState=RpfStart) of the requested RPF activity, at process block 115. After enabling, but before initializing RPF, the owner/driver may be alerted via electronic notification of the intent to carry out the RPF operation and, optionally, provided with the option to override or limit the RPF activity. For instance, the owner may approve reverse power flow, but limit the maximum amount of power that can be extracted or the maximum rate at which power is extracted. Along these same lines, the vehicle owner and/or OEM may limit all VGI activities to ensure a fixed minimum allowable SOC or a fixed minimum allowable vehicle range. Extraction rate may also be modulated in real-time by a resident BCM or other suitable controller based, for example, on limits of the battery pack and vehicle hardware.

If any of the assessments carried out at decision blocks 105, 107 and 113 returns a false determination (block 105 OR block 107 OR block 113=NO), indicating the host vehicle likely should not participate in VGI activities, the method 100 proceeds to process block 117 and informs the owner/driver of the intent to deny the requested RPF operation and, if so desired, the basis for this repudiation. As with any of the occasions in this disclosure where user feedback is invited, human-machine interface may be by way of exchange with the owner/driver's smartphone (e.g., text, app, push notification, email, web browser, etc.), via the center stack telematics unit's touchscreen display 46, via in-vehicle connected support service, or other appropriate methodology. It is envisioned that the operations set forth in blocks 117, 119 and 121 may be altogether eliminated from the method 100 of FIG. 2, for example, in use-cases where user feedback is not considered necessary or is not permitted.

A user, upon learning that an RPF participation request has been denied, may wish to disregard and overrule the vehicle battery system's conclusion. Incidentally, decision block 119 checks for owner/driver input to ascertain if they executed an override option to reverse the decision to decline RPF participation. Every so often, there may be cases in which the operational life expectancy of the vehicle's traction battery pack is deemed subordinate to other needs of the owner/driver. By way of example, the motor vehicle 10 of FIG. 1 may be engaging in an RPF operation to provide a critical service after a natural disaster or other calamity. To obviate misuse of this user-selected override feature, the owner/driver may be penalized for each use or for exceeding a preset maximum number of uses (e.g., battery pack warranty may be reduced or a special "usage fee" may be assessed). If the owner/driver does override the vehicle's decision to deny RPF participation (block 119=YES), method 100 proceeds to process block 121, increments an override counter (OverRideCounter++) and, if the override counter has not reached a preset maximum number of overrides, thereafter advances to process block 115 to enable/initialize RPF. Responsive to a determination that the override option has not been executed (block 119=NO), or the override counter has in fact reached the preset maximum number of overrides, or in algorithm configurations that do not offer an override option, method 100 proceeds to process block 123 and denies the RPF participation request. At this juncture, the method 100 may proceed from block 115 or block 123 to terminal block 125 and terminate, or may loop back to block 101 and run in a continuous loop.

FIG. 3 is a graph depicting battery SOH (%) as a function of time in service (days) to demonstrate how an expected or "nominal" battery life usage 201 compares to actual battery life usage—first and second (current) SOH indicators 203 and 205—of a representative traction battery pack for purposes of evaluating participation in VGI activities. In FIG. 3, SohStartOfLife is a memory-stored, preset calibration value indicative of the state of health of the battery pack at the start of its warranty life (e.g., set to 100%). SohEndOfLife, on the other hand, is a memory-stored, preset calibration value that is indicative of the state of health of the battery pack at the end of its warranty life (e.g., set to 40%). Moreover, DisStartOfLife is a memory-stored, preset calibration value indicative of the total DIS at the beginning of the subject battery pack's operational life (e.g., set to 50 days), whereas DisEndOfLife is a memory-stored, preset calibration value indicative of DIS at the end of the subject battery pack's operational life (e.g., set to 3650 days).

After the host vehicle surpasses a calibrated mileage threshold 207, the subject traction battery pack is monitored to calculate its current SOH when deciding whether or not to permit RPF. According to the representative example of FIG. 3, SohNow1 and SohNow2 are controller variables indicative of the traction battery pack's actual SOH for current SOH indicators 203 and 205, respectively. SohNowLimit1 is a controller variable indicative of the predicted remaining battery life 209 corresponding to the current TIS DisNow1 at which the first current SOH indicator 203 is evaluated. In this instance, the current SOH indicator 203 exceeds the predicted remaining battery life 209; as such, RPF participation may be granted. As a point of comparison, SohNowLimit2 is a controller variable indicative of the predicted remaining battery life 211 corresponding to the current TIS DisNow2 at which the second current SOH indicator 205 is evaluated. In this instance, the current SOH indicator 203 is less than the predicted remaining battery life 211; as such, RPF participation may be denied.

FIG. 4 is a graph depicting battery capacity (Amp-hour percentage) as a function of time in service (years) to demonstrate how an expected or "nominal" life usage 301 compares to an actual or "current" life usage 303 of a representative traction battery pack for purposes of evaluating participation in VGI activities. In FIG. 4, BC at the start of life of the subject pack is a memory-stored, preset calibration value (e.g., set to 100%), whereas battery capacity at the end of life of the subject pack is a memory-stored, preset calibration value (e.g., set to 60%). According to the representative example of FIG. 4, actual BC 303 is monitored on a continual basis throughout its operational life expectancy. For all evaluations to the left of line 305, current BC 303 exceeds the predicted remaining battery life 301; as such, RPF participation may be granted. For all evaluations to the right of line 305, current BC 303 is below the predicted remaining battery life 301; as such, RPF participation may be denied.

Disclosed control logic may employ a binary (Y/N) output, e.g., as described above with respect to the method 100 of FIG. 2, when evaluating requests for RPF participation. Another form of output from this algorithm may comprise a usage fee that the OEM would charge the requesting party to allow V2G participation. For example, vehicles with "significant excess life" may be charged a relatively low participation fee, whereas vehicles with "inadequate excess life" may be charged a relatively high fee to compensate the OEM for the warranty impact to the battery. This conversion fee may be based on the cost of the traction battery pack and the total planned pack mileage at its end-of-life point. As another option, the traction battery pack's warranty may be traded when VGI/V2x is performed. For a vehicle with no excess life available, the OEM may inform the owner/driver that if they perform V2G RPF, the battery warranty will be reduced by "x days" and/or the battery warranty mileage will be decreased by "y equivalent miles." In this instance, the owner/driver may select to either continue with or cancel the V2x event based on the warranty impact to the battery. Vehicle intelligence may convert the total power (kWh) used for V2G grid services to an equivalent total miles using, for example, a nominal energy consumption number, e.g., about 250 Wh/mi on a certified profile. As yet another option, a margin may be added to a "planned life usage" curve to provide a higher certainty of the vehicle making it to a target end-of-life SOH. The magnitude of this margin may be calculated based on actual field performance compared with the exemplary linear model. Vehicle-specific buffers allow for additional or reduced RPF depending upon individual vehicle usage.

It is also envisioned that a derivative of the actual battery life usage curve may be calculated and used to guide VGI/V2x participation. For example, if a host vehicle is running above the exemplary linear curve for some time, but the ASOH/ADIS ratio becomes too great, the algorithm may pause VGI/V2x participation until the ratio returns to a predetermined "normal" level for that particular make/model/version of vehicle. If the OEM were to become an aggregator for demand response programs for VGI activities, the OEM may select which vehicles to offer the option of participating in any given DR event. In this use-case, vehicle intelligence calculates an "excess life" value for each battery pack enrolled in the DR program and selects those with the most excess life. For this exemplary embodiment, the vehicle may calculate a vertical distance between a given pack's actual and planned life usage.

Disclosed control logic may assume a constant degradation of SOH over the life of the host vehicle. More complex algorithms may also monitor the long-term effects on numerous battery pack operating parameters, including pack temperature and internal resistance. Since traction battery packs in constantly high ambient temperature degrade more quickly that packs in more moderate climates, vehicle intelligence may monitor and assess operating temperature when deciding whether or not to approve a VGI activity. Total RPF energy usage may also be monitored as an indicator of whether or not to void the EV's battery pack warranty for excessive RPF usage, e.g., during an override procedure. For this use-case, where users are given the ability to override the algorithm so that the vehicle can still perform RPF, override events are tracked both by number and power usage by the vehicle. A business case determination may then to be made as to how many overrides would be allowed before the battery warranty is voided, in whole or in part.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling a charging operation of an electric-drive motor vehicle, the electric-drive motor vehicle including a traction motor operable to propel the motor vehicle, a traction battery pack operable to power the traction motor, and a vehicle controller programmed to regulate operation of the traction motor and the traction battery pack, the method comprising:

detecting, via the vehicle controller, if the motor vehicle is electrically connected to an electric vehicle supply equipment (EVSE);

determining, via the vehicle controller, if a current vehicle mileage of the motor vehicle is greater than a calibrated mileage threshold;

determining, via the vehicle controller responsive to the motor vehicle being electrically connected to the EVSE and the current vehicle mileage being greater than the calibrated mileage threshold, a current remaining battery life of the traction battery pack and a current time in service of the motor vehicle;
- determining, via the vehicle controller, if the current remaining battery life is greater than a predicted remaining battery life corresponding to the current time in service; and
- enabling, via the vehicle controller responsive to the current remaining battery life being greater than the predicted remaining battery life, the traction battery pack to transmit electrical power to the EVSE.

2. The method of claim 1, wherein determining the current remaining battery life and the current time in service includes determining a current state of health (SOH) of the traction battery pack and a total days in service (DIS) of the motor vehicle, respectively, and wherein the predicted remaining battery life is a memory-stored nominal SOH calibrated to the motor vehicle.

3. The method of claim 1, wherein determining the current remaining battery life and the current time in service includes determining a current battery capacity of the traction battery pack and a total years in service (YIS) of the motor vehicle, respectively, and wherein the predicted remaining battery life is a memory-stored nominal battery capacity calibrated to the motor vehicle.

4. The method of claim 1, further comprising receiving a request to execute a vehicle grid integration (VGI) operation in a reverse power flow (RPF) program with the traction battery pack, wherein determining if the current vehicle mileage is greater than the calibrated mileage threshold is in response to receipt of the request to execute the VGI operation.

5. The method of claim 4, wherein the request is received via the vehicle controller from a power utility company through the EVSE.

6. The method of claim 4, further comprising confirming, via the vehicle controller, that the motor vehicle is registered to participate in the RPF program, wherein determining if the current vehicle mileage is greater than the calibrated mileage threshold is further in response to confirmation that the motor vehicle is registered to participate in the RPF program.

7. The method of claim 1, further comprising:
- receiving, via the vehicle controller from a resident sensing device, a sensor signal indicative of a battery control system fault, a battery temperature of the traction battery pack being greater than a threshold battery temperature, and/or a state of charge (SOC) of the traction battery pack being less than a minimum calibrated SOC; and
- disabling, via the vehicle controller responsive to receipt of the sensor signal, the traction battery pack from transmitting electrical power to the EVSE.

8. The method of claim 1, further comprising:
- retrieving, via the vehicle controller from a memory device, a minimum state of charge (SOC) and/or a maximum power transfer rate for the traction battery pack; and
- transmitting, via the vehicle controller, a command signal to transmit electrical power from the traction battery pack to the EVSE without exceeding the maximum power transfer rate and/or falling below the minimum SOC for the traction battery pack.

9. The method of claim 1, further comprising:
- transmitting, via the vehicle controller to a user of the motor vehicle, a prompt to approve executing a vehicle grid integration (VGI) operation in a reverse power flow (RPF) program with the traction battery pack; and
- transmitting, via the vehicle controller responsive to receiving an approval from the user to execute the VGI operation, a command signal to transmit electrical power from the traction battery pack to the EVSE.

10. The method of claim 1, further comprising disabling, via the vehicle controller responsive to the current remaining battery life not being greater than the predicted remaining battery life and/or the current vehicle mileage not being greater than the calibrated mileage threshold, the traction battery pack from transmitting electrical power to the EVSE.

11. The method of claim 1, further comprising transmitting, via the vehicle controller responsive to the current remaining battery life not being greater than the predicted remaining battery life and/or the current vehicle mileage not being greater than the calibrated mileage threshold, a notice to a user of the motor vehicle indicating a denial to transmit electrical power from the traction battery pack to the EVSE.

12. The method of claim 11, further comprising:
- receiving, via the vehicle controller from the user, an override request commanding the motor vehicle to transmit electrical power from the traction battery pack to the EVSE; and
- transmitting, via the vehicle controller responsive to receiving the override request, a command signal to transmit electrical power from the traction battery pack to the EVSE.

13. The method of claim 1, further comprising:
- receiving, via the vehicle controller from a user of the motor vehicle, a user-selected minimum state of charge (SOC) and/or maximum power transfer for the traction battery pack; and
- transmitting, via the vehicle controller, a command signal to transmit electrical power from the traction battery pack to the EVSE without exceeding the user-selected maximum power transfer and/or falling below the user-selected minimum SOC.

14. The method of claim 1, further comprising:
- transmitting, via the vehicle controller responsive to the current remaining battery life exceeding the predicted remaining battery life, a notice to a user of the motor vehicle indicating an intent to enable the traction battery pack to transmit electrical power to the EVSE; and
- transmitting, via the vehicle controller responsive to receiving an override request from the user, a command signal to disable transmittal of electrical power from the traction battery pack to the EVSE.

15. An electric-drive motor vehicle comprising:
- a vehicle body with a plurality of road wheels;
- a traction motor attached to the vehicle body and configured to drive one or more of the road wheels to thereby propel the motor vehicle;
- a traction battery pack attached to the vehicle body and configured to power the traction motor; and
- a vehicle controller configured to regulate operation of the traction motor and the traction battery pack, the vehicle controller being programmed to:
  - detect if the motor vehicle is electrically connected to an electric vehicle supply equipment (EVSE);
  - determine if a current vehicle mileage of the motor vehicle is greater than a calibrated mileage threshold;
  - responsive to the motor vehicle being electrically connected to the EVSE and the current vehicle mileage being greater than the calibrated mileage threshold, determine a current remaining battery life of the traction battery pack and a current time in service of the motor vehicle;

determine if the current remaining battery life is greater than a predicted remaining battery life corresponding to the current time in service; and responsive to the current remaining battery life being greater than the predicted remaining battery life, command the traction battery pack to transmit electrical power to the EVSE.

16. The electric-drive vehicle of claim 15, wherein determining the current remaining battery life and the current time in service includes determining a current state of health (SOH) of the traction battery pack and a total days in service (DIS) of the motor vehicle, respectively, and wherein the predicted remaining battery life is a memory-stored nominal SOH calibrated to the motor vehicle.

17. The electric-drive vehicle of claim 15, wherein determining the current remaining battery life and the current time in service includes determining a current battery capacity of the traction battery pack and a total years in service (YIS) of the motor vehicle, respectively, and wherein the predicted remaining battery life is a memory-stored nominal battery capacity calibrated to the motor vehicle.

18. The electric-drive vehicle of claim 15, wherein the vehicle controller is further programmed to receive a request to execute a vehicle grid integration (VGI) operation in a reverse power flow (RPF) program with the traction battery pack, and wherein determining if the current vehicle mileage is greater than the calibrated mileage threshold is in response to receipt of the request to execute the VGI operation.

19. The electric-drive vehicle of claim 15, wherein the vehicle controller is further programmed to:
receive a sensor signal from a resident sensing device indicative of a system fault in a vehicle battery control system of the motor vehicle, a battery temperature of the traction battery pack being greater than a threshold battery temperature, and/or a state of charge (SOC) of the traction battery pack being less than a minimum calibrated SOC; and responsive to receipt of the sensor signal, disable the traction battery pack from transmitting electrical power to the EVSE.

20. The electric-drive vehicle of claim 15, wherein the vehicle controller is further programmed to:
retrieve, from a memory device, a minimum state of charge (SOC) and/or a maximum power transfer rate for the traction battery pack; and transmit a command signal to transmit electrical power from the traction battery pack to the EVSE without exceeding the maximum power transfer rate and/or falling below the minimum SOC for the traction battery pack.

* * * * *